United States Patent [19]

Hiraiwa et al.

[11] Patent Number: 4,507,981
[45] Date of Patent: Apr. 2, 1985

[54] TRANSMISSION SHIFT CONTROL MECHANISM

[75] Inventors: Kazuyoshi Hiraiwa, Atsugi; Saburou Yamasaki, Sagamihara, both of Japan

[73] Assignee: Nissan Motor Company, Limited, Japan

[21] Appl. No.: 383,257

[22] Filed: May 28, 1982

[30] Foreign Application Priority Data

Jun. 1, 1981 [JP] Japan .................................. 56-82546

[51] Int. Cl.³ ........................... G05G 5/10; G05G 9/16
[52] U.S. Cl. .................................... 74/477; 74/473 R
[58] Field of Search .............................. 74/477, 473 R

[56] References Cited

U.S. PATENT DOCUMENTS

| | | | |
|---|---|---|---|
| 3,915,027 | 10/1975 | Simmons et al. | 74/473 R |
| 3,916,718 | 11/1975 | Kebel et al. | 74/471 R |
| 3,962,930 | 6/1976 | Frazee | 74/473 R |
| 4,193,316 | 3/1980 | Kelbel | 74/477 |
| 4,277,983 | 7/1981 | Izumi et al. | 74/477 |

FOREIGN PATENT DOCUMENTS

| | | |
|---|---|---|
| 1245759 | 7/1967 | Fed. Rep. of Germany . |
| 4819691 | of 0000 | Japan . |
| 5557925 | of 0000 | Japan . |
| 469687 | 1/1979 | Japan . |
| 100466 | 7/1980 | Japan . |
| 1183796 | 3/1970 | United Kingdom . |
| 1274334 | 5/1972 | United Kingdom . |
| 2062144 | 5/1981 | United Kingdom . |

Primary Examiner—Allan D. Herrmann
Attorney, Agent, or Firm—Lowe, King, Price & Becker

[57] ABSTRACT

In a transmission shift control mechanism of the type having a control input shaft and a fork shaft which are arranged substantially normal to each other, an interlock member is adapted to function as a member for translating rotary movement of the control input shaft into rotary movement of the fork shaft in addition to its inherent function of preventing a selector finger from shifting two shift forks simultaneously.

9 Claims, 6 Drawing Figures

FIG.5      FIG.6

TRANSMISSION SHIFT CONTROL MECHANISM

BACKGROUND OF THE INVENTION

1. Field of the Invention

The present invention relates to a shift control mechanism for an automotive manual transmission, particularly a transmission adapted for transverse mounting on a front-wheel-drive or rear-wheel-drive vehicle.

2. Description of the Prior Art

In shift control mechanisms for transmissions of the above described kind, a control input shaft is arranged substantially normal to a selector shaft having a shift fork selecting and shifting lever. A linkage is provided between the control input shaft and the selector shaft to translate axial movement of the control input shaft into axial movement of the selector shaft and also translate rotary movement of the control input shaft into rotary movement of the selector shaft. One such shift control mechanism is disclosed in the Japanese Utility Model Publication No. 46-9687. As disclosed therein a bellcrank lever is utilized to translate axial movement of the control input shaft into axial movement of the selector shaft and a pair of swinging levers are also utilized to translate rotary movement of the control input shaft into rotary movement of the selector shaft. The pair of swinging levers are respectively secured at one end thereof to the control input shaft and the selector shaft to move together therewith and coupled at the other end thereof in such a way as to allow relative movement thereof.

One disadvantage of such arrangement is the requirement of the swinging lever which is secured to the selector shaft for movement together therewith. This swinging lever not only swings in response to rotation of the selector shaft but also moves axially of the selector shaft in response to axial movement of same. This results in a bulky shift control mechanism which in turn requires a large housing for a transmission.

Another disadvantage is the requirement of the pair of large swinging levers so that the levers which are relatively movably coupled at the free ends thereof are not disengaged from each other since axial movement of the control input shaft or the selector shaft causes one of the levers to move away from the other.

SUMMARY OF THE INVENTION

In accordance with the present invention, there is provided a transmission shift control mechanism which comprises a housing, a control input shaft rotatable and slidable in the wall of the housing, a fork shaft substantially normal to the control input shaft and rotatable and slidable in the wall of the housing, a plurality of shift forks movable between predetermined neutral and shifting positions and having slots arranged side-by-side in a prdetermined array when the shift forks are in the neutral positions thereof, a selector lever secured to the fork shaft to move together therewith and having a selector finger movable in the slots whilst accompanying rotary movement of the fork shaft so as to be selectively engaged in one of the slots, the selector lever being operative to shift selected one of the shift forks into the corresponding shifting position through movement along the axis of said fork shaft together with same, an interlock member for preventing simultaneous shifting of two of the shift forks, the interlock member being mounted on the fork shaft and drivingly connected to the selector lever in such a manner as to be rotatable together with the selector lever but held axially of the fork shaft stationary relative to the housing whilst allowing axial movement of the selector lever relative to said interlock member, a control arm secured to the control input shaft to move together therewith, the interlock member having an arm coupled with the control arm to cooperate therewith for translating rotary movement of the control input shaft into rotary movement of the selector lever and the fork shaft, and bellcrank connection means for translating axial movement of the control input shaft into axial movement of the fork shaft and the selector lever.

This structure enables to overcome the disadvantages noted above and to attain a simplified and compact structure.

It is accordingly an object of the present invention to provide a novel and improved transmission shift control mechanism which enables to overcome the disadvantages noted above.

It is another object of the present invention to provide a novel and improved transmission shift control mechanism of the above described character which enables to attain a simplified and compact structure as well as to reduce the number of constituent parts.

It is a further object of the present invention to provide a novel and improved transmission shift control mechanism for the above described character which is enabled to attain a small-sized shift pattern effective for improving the gearshift lever operation characteristics.

BRIEF DESCRIPTION OF THE DRAWINGS

The features and advantages of the shift control mechanism according to the present invention will become more clearly appreciated from the following description taken in conjunction with the accompanying drawings, in which:

FIG. 5 is a view taken along the arrow C of FIG. 4; and

FIG. 6 is a sectional view taken along the line D—D of FIG. 4.

DESCRIPTION OF THE PREFERRED EMBODIMENT

Figure 1:
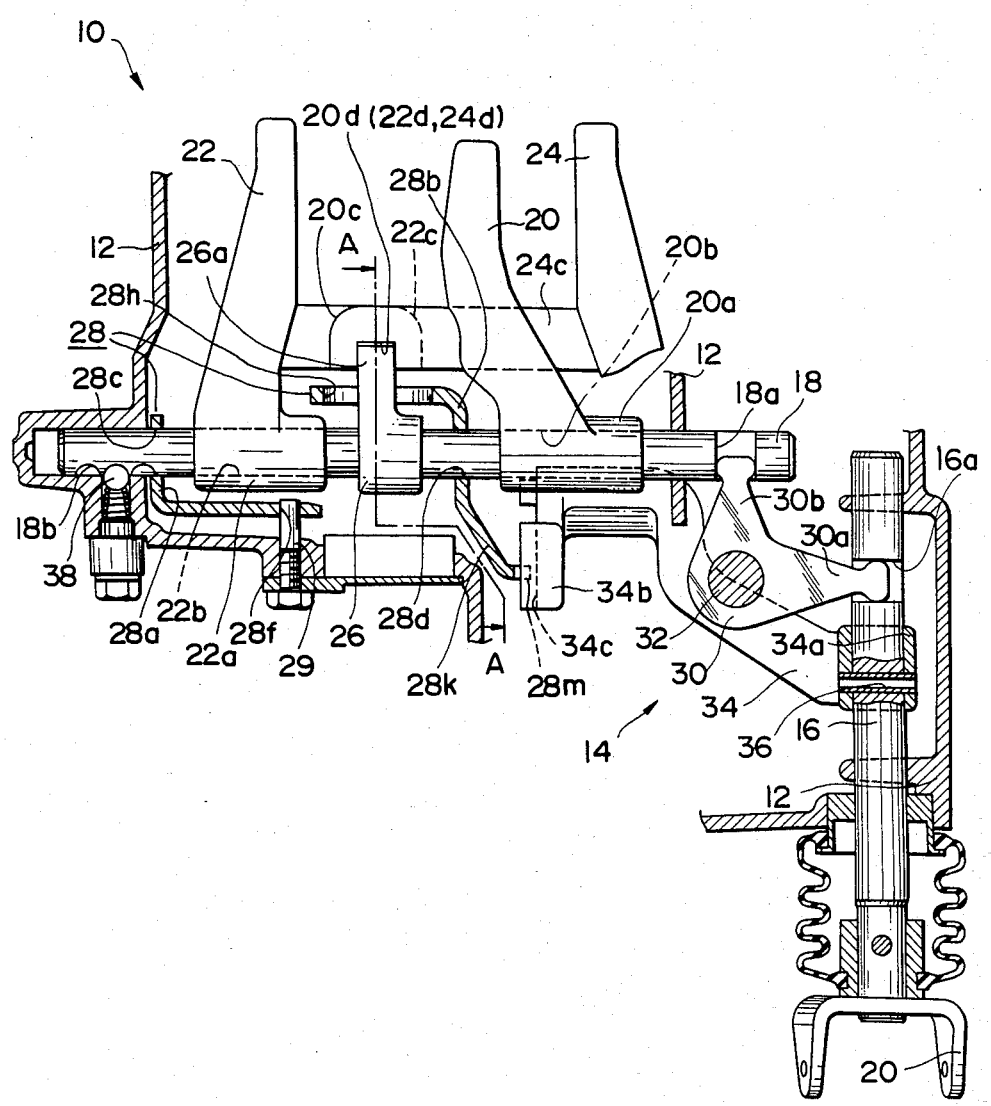
FIG. 1 is a partly sectional plan view of a shift control mechanism according to the present invention.

Referring now to the drawings in greater detail, there is shown a transmission 10 which is adapted for use in an automotive vehicle incorporating a transversely mounted engine though some parts and portions are omitted to better illustrate the invention. The transmission 10 is particularly adapted for transverse mounting so as to transmit torque from the engine through the drive axle assembly to the front wheels. The transmission 10 includes a housing 12 which may be an associated clutch housing, and which may include or be adjacent to an associated differential.

A shift control mechanism according to the present invention is generally indicated at 14 and shown to comprise a control input shaft 16 and a selector shaft or fork shaft 18 which are rotatable and slidable in the wall of the housing 12 and arranged substantially normal to each other. The control input shaft 16 protrudes at one end thereof from the housing 12 and is operatively connected through a yoke 20 to a manually operated gearshift lever (not shown) in the usual way, that is, in such a way that one movement or transverse movement of the gearshift lever effects rotary movement of the control input shaft 16 and another movement or fore-and-aft movement of the gearshift lever effects axial movement of the control input shaft 16. A first-second shift fork 20 and a third-fourth shift fork 22 are slidably mounted on the fork shaft 18. That is, the first-second shift fork 20 and the third-fourth shift fork 22 are formed at the hub portions 20a and 22a thereof with bores 20b and 22b, respectively through which the fork shaft 18 extends in a manner to be rotatable and slidable relative to the shift forks 20 and 22. Though not shown, there is also provided a fork shaft in parallel with the fork shaft 18 and on which a fifth-reverse shift fork 24 is slidably mounted. The shift forks 20-24 are illustrated in their neutral positions in FIG. 1 and selectively movable rightwardly therefrom for obtaining the first forward gear ratio, the third forward gear ratio and the fifth forward gear ratio, respectively and also selectively movable leftwardly therefrom for obtaining the second forward gear ratio, the fourth forward gear ratio and the reverse gear ratio, respectively. To enable such selective movement the shift forks 20-24 are provided at the hub portions 20a, 22a and 24a with such extensions 20c, 22c and 24c that are adapted to be arranged in stacked relationship at the free end portions thereof and formed at the free end portions with slots 20d, 22d and 24d which are aligned with each other or arranged side-by-side in a circular array when the shift forks 20, 22 and 24 are in their neutral positions as shown in FIG. 1.

Figure 4:
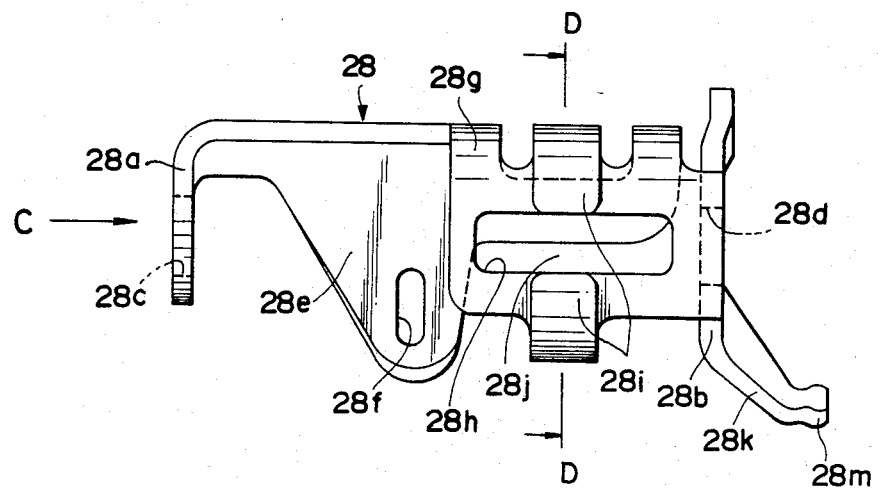
FIG. 4 is a side elevation of an interlock member utilized in the shift control mechanism of FIG. 1.
Figure 4:
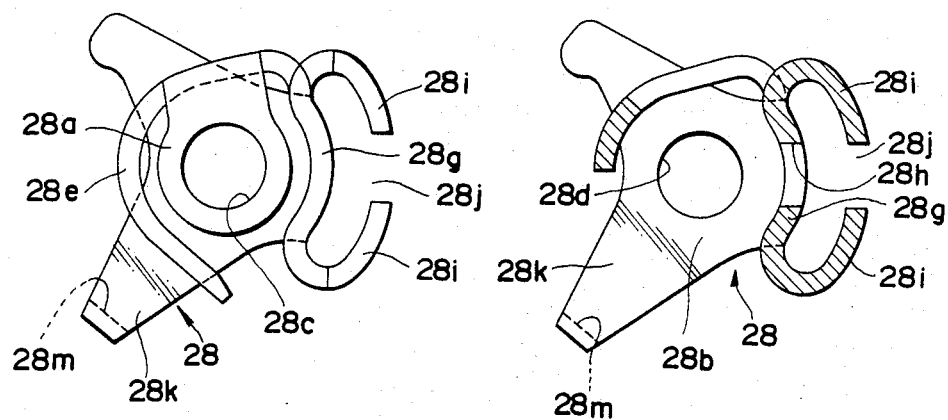

A selector lever is indicated at 26 and secured to the fork shaft 18 to move together therewith. The selector lever 26 has a selector finger 26a which is adapted to be received in the slots 20d, 22d and 24d in a manner to be movable from one slot into another in response to rotation of the fork shaft 18. An interlock member is indicated at 28 which is mounted on the fork shaft 18 for rotation together therewith but for axial movement independent of same. The interlock member 28 is of a single piece formed from a sheet material as better shown in FIGS. 4-6 and has a pair of end flanges 28a and 28b which are opposed axially of the fork shaft 18. The end flanges 28a and 28b are formed with bores 28c and 28d which are aligned with each other to receive rotatably and slidably therein the fork shaft 18. The interlock member 28 also has a tubiform wall portion 28e adjacent the end wall 28a and partly surrounding the fork shaft 18. The tubiform wall portion 28e is formed with an elongated hole 28f which is elongated circumferentially thereof or along the circumference of the fork shaft 18 to receive therein a guide pin 29 screwed into the wall of the housing 12 so that the interlock member 28 is rotatable together with the fork shaft 18 and therefore the selector lever 26 but held axially of the fork shaft 18 stationary relative to the housing 12 while allowing axial movement of the selector lever 26 relative to the interlock member 28. The interlock member 28 has another tubiform wall portion 28g adjacent the end wall 28b and partly surrounding the fork shaft 18. The tubiform wall portion 28g is formed with an elongated hole 28h which is elongated axially of the fork shaft 18 and into which the selector lever 26 is inserted for rotation together with the interlock member 28 but for axial movement independent of same since the selector lever 26 is adapted to be movable within the elongated hole 28h in the longitudinal direction thereof only.

The interlock member 28 also has a pair of finger portions 28i and 28i which are spaced circumferentially of the tubiform wall portion 28g. The finger portions 28i and 28i extend radially outward and upward from the tubiform wall portion 28g along respective curves, which are of the same curvature and arranged symmetrical, to go nearer toward the terminal ends thereof. Between the terminal ends of the finger portions 28i and 28i, there is provided an elongated space 28j which is aligned with and has substantially the same width as the corresponding width of the elongated hole 28h so that the selector finger 26a extends through the elogated hole 28h into the space 28j, that is, the selector finger 26a has an end portion placed between the terminal ends of the finger portions 28i and 28i. Each finger portion 28i has substantially the same width as the corresponding width of the selector finger 26a and the width of which finger portion 28i is a little smaller than the width of the slots 20d, 22d and 24d so that the finger portions 28i and 28i are movable in the slots 20d, 22d and 24d together with the selector finger 26a which are placed between the finger portions 28i and 28i in response to rotation of the shift fork 18. The interlock member 28 also has an arm 28k extending from the end flange 28b, which is nearer to the control input shaft 16 than the other end flange 28a, in the direction to go apart from the fork shaft 18 to terminate at a bent end to provide an engagement finger 28m substantially in parallel with the fork shaft 18.

A bellcrank lever 30 is provided to translate axial movement of the control input shaft 12 into axial movement of the fork shaft 18. The bellcrank lever 30 is pivotally mounted on a pivot shaft 32 which is arranged substantially normal to both the control input shaft 16 and the fork shaft 18 and fixedly attached to the housing 12. The bellcrank lever 30 has two lever arms 30a and 30b which are respectively formed with rounded ends whilst the control input shaft 16 and the fork shaft 18 are respectively formed with grooves 16a and 18a into which the rounded ends of the lever arms 30a and 30b are respectively inserted in such a manner that the rounded ends of the lever arms 30a and 30b are movable in the respective grooves 16a and 18a to allow rotation of the control input shaft 16 and the fork shaft 18 as well as axial movement of same. In this instance, it is important for the grooves 16a and 18a to be deep enough to prevent disengagement of the lever arms 30a and 30b from the corresponding grooves 16a and 18a upon rotation of the control input shaft 16 and the fork shaft 18.

A control arm 34 is provided to translate rotary movement of the control input shaft 16 into rotary movement of the fork shaft 18. The control arm 34 is fixedly attached at its hub portion 34a to the control input shaft 16 by means of a lock pin 36 so that the control arm is movable together with the control input shaft. The control arm 34 extends away from the control input shaft 16 toward the arm 28k of the interlock member 28 to terminate at an end 34b where it is formed with an elongated groove 34c which is elongated parallel to along the axis of said control input shaft and in which the engagement finger 28m is engaged. The groove 34c in the end 34b of the control arm 34 is formed long enough to prevent disengagement of the finger 28m therefrom upon axial movement of the control input shaft 16.

The fork shaft 18 is formed with spaced notches 18b and a spring-biased detent ball 38 is provided to engage in one of the notches 18b to retain the fork shaft 18 in one of its axial positions, that is, shifting positions.

The operation of the shift control mechanism constructed and arranged as above according to the present invention will be described hereinbelow.

Figure 2:
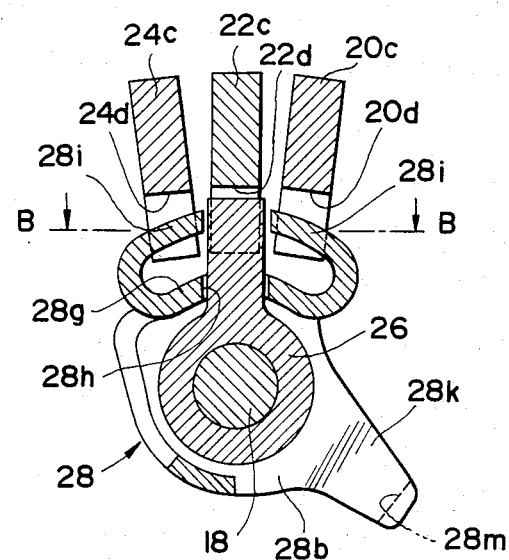
FIG. 2 is a sectional view taken along the line A—A of FIG. 1.
Figure 3:
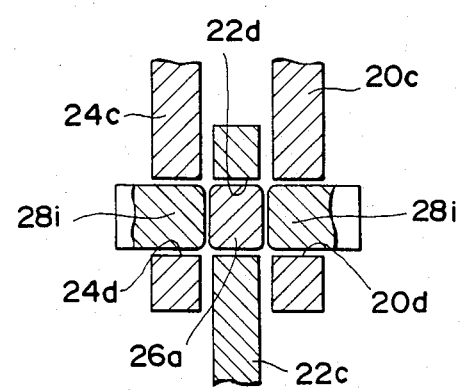
FIG. 3 is a sectional view taken along the line B—B of FIG. 2.

The shift control mechanism of this invention is illustrated in FIGS. 1-3 in its operative condition into which it is put when the gearshift lever is in the neutral position thereof. The upper end of the gearshift lever is movable transversely from the neutral position into two selecting positions, i.e., a first and second forward gear selecting position and a fifth forward gear and reverse gear selecting position. From each selecting position, the upper end of the gearshift lever is movable fore-and-aft into two shifting positions. That is, from the first and second forward gear selecting position the upper end of the gear shift lever is movable fore-and-aft into a first forward gear shifting position and a second forward gear shifting position, whilst from the fifth forward gear and reverse gear selecting position the upper end of the gearshift lever is movable fore-and-aft into a fifth forward selecting position and a reverse gear selecting position. The upper end of the gearshift lever is further movable fore-and-aft from the neutral position into a third forward gear shifting position and a fourth forward gear shifting position as will be described more in detail hereinbelow.

To establish the first forward gear ratio, the upper end of the gearshift lever is first moved transversely from the neutral position into the first and second forward gear selecting position. This transverse movement of the gearshift lever causes the control input shaft 16 to rotate counterclockwise together with the control arm 34 when the control input shaft 16 is viewed from the end provided with the yoke 20. This causes the interlock member 28 to rotate clockwise in FIG. 2, which in turn causes the selector lever 26 and the fork shaft 18 to rotate in the corresponding direction into an angular position where the selector finger 26a is engaged in the slot 20d of the first-second shift fork 20. The upper end of the gearshift lever is then moved fore-and-aft from the first and second forward gear selecting position into the first forward gear shifting position. This fore-and-aft movement of the gearshift lever causes the control input shaft 16 to slide downward in FIG. 1, i.e., away from the fork shaft 18. This causes the bellcrank lever 30 to rotate clockwise in FIG. 1, which in turn causes the fork shaft 18 to slide rightwardly from the neutral position in FIG. 1 together with the selector lever 26. This rightward movement of the selector lever 26 causes the shift fork 20 to move in the corresponding direction to establish the first forward gear ratio.

During the above rightward movement of the selector lever 26, one of the finger portions 28i and 28i of the interlock member 28 (the left-handed finger portion in FIGS. 2 and 3) is engaged in the slots 22d and 24d of the third-fourth shift fork 22 and the fifth-reverse shift fork 24 to thereby hold the shift forks 22 and 24 in their neutral positions.

To establish the second forward gear ratio, the upper end of the gearshift lever is first moved transversely from the neutral position into the first and second forward gear selecting position similarly to the case of establishing the first forward gear ratio and then moved fore-and-aft from the first and second forward gear selecting position into the second forward gear shifting position. This fore-and-aft movement of the gearshift lever causes the control input shaft 16 to slide upward in FIG. 1, i.e., toward the fork shaft 18. This causes the bellcrank lever 30 to rotate counterclockwise in FIG. 1, which in turn causes the fork shaft 18 to slide leftwardly from the neutral position in FIG. 1 together with the selector lever 26. This leftward movement of the selector lever 26 causes the shift fork 20 to move in the corresponding direction to establish the second forward gear ratio. During the above leftward movement of the selector lever 26, the interlock member 28 holds the other shift forks 22 and 24 in their neutral positions similarly to the previous case of establishing the first forward gear ratio.

When the gearshift lever is in the neutral position, the selector finger 26a is engaged in the slot 22d of the third-fourth shift fork 22. That is, the neutral position of the gearshift lever coincides with the third and fourth forward gear selecting position.

To establish the third forward gear ratio, the upper end of the gearshift lever is therefore moved fore-and-aft from the neutral position into the third forward gear shifting position. This fore-and-aft movement of the gearshift lever causes the control input shaft 16 to slide downward in FIG. 1, i.e., away from the fork shaft 18. This causes the bellcrank lever 30 to rotate clockwise in FIG. 1, which in turn causes the fork shaft 18 to slide rightwardly from the neutral position in FIG. 1 together with the selector lever 26. This rightward movement of the selector lever 26 causes the shift fork 22 to move in the corresponding direction to establish the third forward gear ratio.

To establish the fourth forward gear ratio, the upper end of the gearshift lever is moved fore-and-aft from the neutral position into the fourth forward gear shifting position. This fore-and-aft movement of the gearshift lever causes the control input shaft 16 to slide upward in FIG. 1, i.e., toward the fork shaft 18. This causes the bellcrank lever 30 to rotate counterclockwise in FIG. 1, which in turn causes the fork shaft 18 to slide leftwardly from the neutral position in FIG. 1 together with the selector lever 26. This leftward movement of the selector lever 26 causes the shift fork 22 to move in the corresponding direction to establish the fourth forward gear ratio.

During such rightward or leftward movement of the selector lever 26 to eatablish the third or fourth forward gear ratio, the finger portions 28i and 28i of the interlock member 28 are respectively engaged in the slots 20d and 24d of the first-second shift fork 20 and the fifth-reverse shift fork 24 as shown in FIGS. 2 and 3 for thereby holding the shift forks 20 and 24 in their neutral positions.

To establish the fifth forward gear ratio, the upper end of the gearshift lever is moved transversely from the neutral position into the fifth forward gear and reverse gear selecting position. This transverse movement of the gearshift lever causes the control input shaft 16 to rotate clockwise together with the control arm 34 when the control input shaft 16 is viewed from the end provided with the yoke 20. This causes the interlock member 28 to rotate counterclockwise in FIG. 2, which in turn causes the selector lever 26 and the fork shaft 18 to rotate in the corresponding direction into an angular position where the selector finger 26a is engaged in the slot 24d of the shift fork 24. The upper end of the gearshift lever is then moved fore-and-aft from the fifth forward gear and reverse gear selecting position into the fifth forward gear selecting position. This fore-and-aft movement of the gearshift lever causes the control input shaft 16 to slide downward in FIG. 1, i.e., away from the fork shaft 18. This causes the bellcrank lever 30 to rotate clockwise in FIG. 1, which in turn causes the fork shaft 18 to move in the corresponding direction to establish the fifth forward gear ratio.

To establish the reverse gear ratio, the upper end of the gearshift lever is first moved transversly from the neutral position into the fifth forward gear and reverse gear selecting position similarly to the case of establish the fifth forward gear ratio and then moved fore-and-aft from the fifth forward gear and reverse gear selecting position into the reverse gear shifting position. This fore-and-aft movement of the gearshift lever causes the control input shaft 16 to slide upward in FIG. 1, i.e., toward the fork shaft 18. This causes the bellcrank lever 30 to rotate counterclockwise in FIG. 1, which in turn causes the fork shaft 18 to slide leftward from the neutral position in FIG. 1 together with the selector lever 26. This leftward movement of the selector lever 26 causes the shift fork 24 to move in the corresponding direction to establish the reverse gear ratio.

During such rightward or leftward movement of the selector lever 26 to establish the fifth forward gear ratio or reverse gear ratio, one of the finger portions 28i and 28i of the interlock member 28 (the right-handed finger portion in FIGS. 2 and 3) is engaged in the slots 20d and 22d of the first-second shift fork 20 and the third-fourth shift fork 22 for thereby holding the shift forks 20 and 22 in their neutral positions.

In the foregoing, it is to be understood that the interlock member 28 assuredly prevents two of the shift forks from being simultaneously moved into their shifting positions since when the selector finger 26a is engaged in two of the slots, the finger portions of the interlock member are also engaged in the same slots to hold the corresponding two shift forks as well as the other shift fork in their neutal positions, that is, the fore-and-aft movement of the gearshift lever from such erroneous selecting position is prevented.

From the foregoing, it is to be understood that the interlock member in the shift control mechanism of this invention is adapted to function, in addition to its inherent function, as a member for translating rotary movement of the control input shaft into rotary movement of the fork shaft whereby a part or parts otherwise required in the comparable prior art mechanism can be dispensed with, enabling to obtain a simplified and compact structure as well as to reduce the number of constituent parts.

It is further to be understood that the control arm in the shift control mechanism of this invention can be designed longer than conventional, enabling to attain a small-sized shift pattern for improving the gearshift lever operation characteristics since rotary movement of the control input shaft is transmitted to the fork shaft after multiplied by the control arm.

Obviously, many variations and modifications of the present invention are possible in light of the above teachings. It is, therefore, to be understood that within the scope of the appended claims, the invention may be practiced otherwise than as specifically described.

What is claimed is:

1. A transmission shift control mechanism comprising a housing, a control input shaft rotatable and slidable in a wall of said housing, a fork shaft substantially normal to said control input shaft and rotatable and slidable in the wall of said housing, a plurality of shift forks movable between predetermined neutral and shifting positions and having slots arranged side-by-side in a predetermined array when said shift forks are in the neutral positions thereof, a selector lever secured to said fork shaft to move together therewith and having a selector finger movable in said slots in response to rotary movement of said fork shaft in response to rotary movement of said fork shaft so as to selectively engage in one of said slots, said selector lever being operable to shift a selected one of said shift forks into the corresponding shifting position through movement along the axis of said fork shaft together with same, an interlock member for preventing simultaneous shifting of two of said shift forks, said interlock member being mounted on said fork shaft and drivingly connected to said selector lever for rotation with said selector lever but held axially stationary of said fork shaft relative to said housing while allowing axial movement of said selector lever relative to said interlock member, a control arm having a hub portion at one end thereof mounted on said control input shaft for rotation therewith and an opposite end directly attached to an arm of said interlock member for translating rotary movement of said control input shaft into rotary movement of said selector lever and said fork shaft, and means for translating axial movement of said control input shaft into axial movement of said fork shaft and said selector lever, said control arm being operable to rotate the selector shaft in response to rotation of the control input shaft.

2. A transmission shift control mechanism as set forth in claim 1, wherein said control arm secured at one end thereof to said control input shaft extends therefrom toward said arm of said interlock member to terminate in an opposite end formed with an elongate groove extending generally parallel to said control input shaft, said arm of said interlock member extending away from said fork shaft and terminating at a bent portion to provide an engagement finger extending generally parallel to said fork shaft and engaging in said elongated groove.

3. A transmission shift control mechanism as set forth in claim 2, wherein said interlock member further includes a pair of end flanges opposed axially of said fork shaft and a first tubiform wall portion partly surrounding said fork shaft, said end flanges being respectively formed with bores aligned to rotatably and slidably receive therein said fork shaft, said arm of said interlock member extending from one of said end flanges located closer to said control input shaft than the other end flange, said first tubiform wall portion being formed with an elongate opening elongated along the circumference of said fork shaft to receive therein a guide pin screwed into the wall of said housing so that said interlock member is somewhat rotatable but held axially stationary of said fork shaft relative to said housing.

4. A transmission shift control mechanism comprising a housing, a control input shaft rotatable and slidable in a wall of said housing, a fork shaft substantially normal to said control input shaft and rotatable and slidable in the wall of said housing, a plurality of shift forks movable between predetermined neutral and shifting positions and having slots arranged side-by-side in a predetermined array when said shift forks are in the neutral positions thereof, a selector lever secured to said fork shaft to move together therewith and having a selector finger movable in said slots in response to rotary movement of said fork shaft so as to selectively engage in one of said slots, said selector lever being operable to shift a selected one of said shift forks into the corresponding shifting position through movement along the axis of said fork shaft together with same, an interlock member for preventing simultaneous shifting of two of said shift forks, said interlock member being mounted on said fork shaft and drivingly connected to said selector lever for rotation with said selector lever but held axially stationary of said fork shaft relative to said housing while allowing axial movement of said selector lever relative to said interlock member, a control arm having one end secured to said control input shaft for movement therewith, said interlock member having an arm attached to said control arm to cooperate therewith for translating rotary movement of said control input shaft into rotary movement of said selector lever and said fork shaft, and bellcrank connection means for translating axial movement of said control input shaft into axial movement of said fork shaft and said selector lever, wherein said control arm secured at one end thereof to said control input shaft extends therefrom toward said arm of said interlock member to terminate in an opposite end formed with an elongate groove extending generally parallel to said control input shaft, said arm of said interlock member extending away from said fork shaft and terminating at a bent portion to provide an engagement finger extending generally parallel to said fork shaft and engaging in said elongated groove, wherein said interlock member further includes a pair of end flanges opposed axially of said fork shaft and a first tubiform wall portion partly surrounding said fork shaft, said end flanges being respectively formed with bores aligned to rotatably and slidably receive therein said fork shaft, said arm of said interlock member extending from one of said end flanges located closer to said control input shaft then the other end flange, said first tubiform wall portion being formed with an elongate opening elongated along the circumference of said fork shaft to receive therein a guide pin screwed into the wall of said housing so that said interlock member is somewhat rotatable but held axially stationary of said fork shaft relative to said housing.

5. A transmission shift control mechanism as set forth in claim 4, wherein said interlock member further includes a second tubiform wall portion partly surrounding said fork shaft and formed with an elongate opening elongated axially of said fork shaft, said selector lever being inserted in said second named elongated opening in a manner to be movable longitudinally thereof so that said interlock member is drivingly connected to said selector lever for rotation therewith while allowing axial movement of said selector lever relative to said interlock member.

6. A transmission shift control mechanism as set forth in claim 5, wherein said interlock member further includes a pair of finger portions spaced circumferentially of said second tubiform wall portion and extending radially outward therefrom along respective symmetrical curves so that terminal ends of the finger portions approach each other to form therebetween an elongate space aligned with said second named elongate opening and between which said selector finger passes through said second named elongated opening, said finger portions having substantially the same width as the corresponding width of said selector finger and capable of being aligned so as to be movable in said slots together with said selector finger in response to rotation of said interlock member.

7. A transmission shift control mechanism as set forth in claim 6, wherein said interlock member is a single piece formed from a sheet material.

8. A transmission shift control mechanism as set forth in claim 4, wherein said shift forks respectively include hub portions mounted for movement along the axis of said fork shaft, said hub portions having extensions arranged in stacked relationship at free end portions thereof, said extensions being formed at their free end portions with said slots, respectively.

9. A transmission shift control mechanism as set forth in claim 4, wherein said bellcrank connection means includes a bellcrank lever rotatably mounted on a pivot shaft extending generally normal to both said control input shaft and said fork shaft and fixedly attached to said housing, said bellcrank lever having two lever arms formed with rounded ends, respectively, and in which said control input shaft and said fork shaft are formed with grooves in which said bellcrank lever arms are movably received at the rounded ends thereof, respectively.

* * * * *